April 21, 1953 — C. P. YOUNG — 2,635,914
FISHING TOOL
Filed Feb. 21, 1948 — 3 Sheets-Sheet 1

Clarence P. Young,
INVENTOR.

BY Hazard & Miller
ATTORNEYS

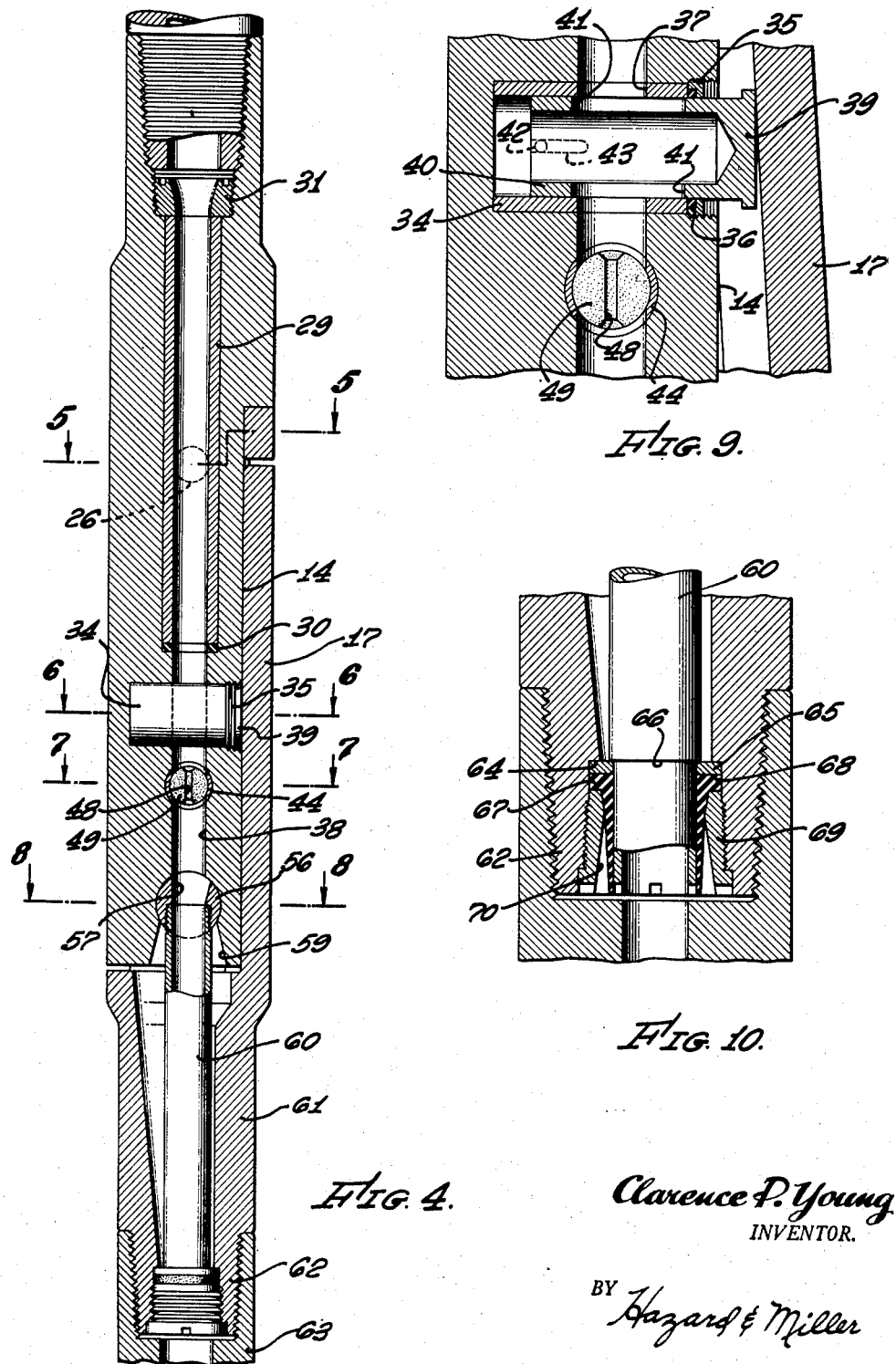

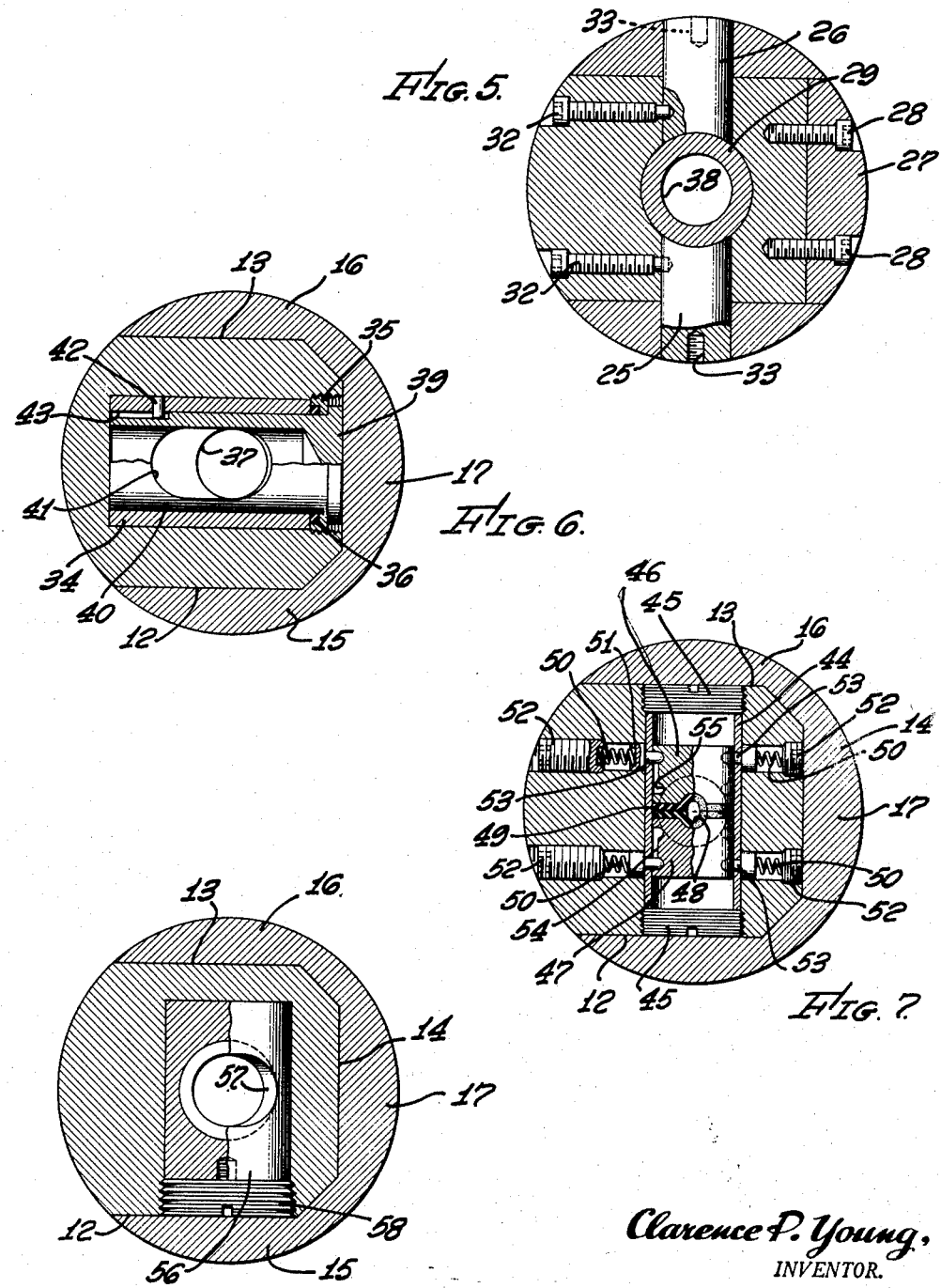

Patented Apr. 21, 1953

2,635,914

UNITED STATES PATENT OFFICE 2,635,914

FISHING TOOL

Clarence P. Young, Bellflower, Calif.

Application February 21, 1948, Serial No. 10,072

7 Claims. (Cl. 294—86)

This invention relates to improvements in fishing tools such as are used in oil wells and may be considered as an improvement over the construction disclosed in my copending application, Serial No. 733,335, filed March 8, 1947, now Patent No. 2,609,226, entitled Straight Bore Hydraulic Knuckle.

An object of the present invention is to provide an improved hydraulic knuckle wherein there is a novel and advantageous pivotal connection between the swinging arm of the knuckle and the body of the tool to which it is attached. Heretofore in tools of this character pivot pins have generally been relied upon to pivotally connect the swinging arm to the body and although sides of the swinging arm closely embrace sides of the body the pivot pin is subject to very severe strains when the fish is engaged and bearing operations are performed. In the usual construction, the pivot pin can not be made of very large size without weakening the body of the tool that accommodates it. On the other hand, if the pivot pin is made small to preserve the strength of the body of the tool when great forces are transmitted from the body to the arm or vice versa the pivot pin may not be strong enough to carry them. In accordance with the present invention, although a pivot pin is used to pivotally connect the swinging arm to the body arcuate bearing surfaces are provided between the arm and the body both above and below the pivot pin. These bearing surfaces may be arranged on a relatively large diameter as compared with that of the pivot pin without involving weakening of either the body or the arm and are much more than adequate to transmit heavy stresses either in upward jarring or downward jarring after the fish has been engaged in endeavoring to loosen the fish.

Another object of this invention is to provide a fishing tool having the above mentioned characteristics wherein the bearing surfaces above referred to are so arranged that the arm can not become detached from the body even though the pivot pin should fall or become sheared off and wherein at least one of the bearing surfaces is so designed as to resist splitting of the sides of the arm.

Another object of the invention is to provide a straight bore hydraulic knuckle wherein a pipe or tube is arranged in the body and which extends through the pivot pin in such a manner that there is no opportunity for leakage of circulation fluid around the pivot pin.

Another object of the invention is to provide a straight bore hydraulic knuckle wherein the swingable arm is actuated by a piston subject to the pressure of the circulation fluid that is forced downwardly through the body and wherein the piston is not only held against rotation but is so designed as to leave the circulation through the body fully open in all positions.

Other objects of the invention are to provide a tool of this character wherein there is a novel wear-resisting openable bean or choke and to provide the novel, simple and advantageous seal between the lower end of the wash pipe and the swingable arm.

With the foregoing and other objects in view, which will be made manifest in the following detailed description and specifically pointed out in the appended claims, reference is had to the accompanying drawings for an illustrative embodiment of the invention, wherein:

Fig. 4 is a sectional view taken substantially upon the line 4—4 upon Fig. 3;

Figures 1, 2, 3:
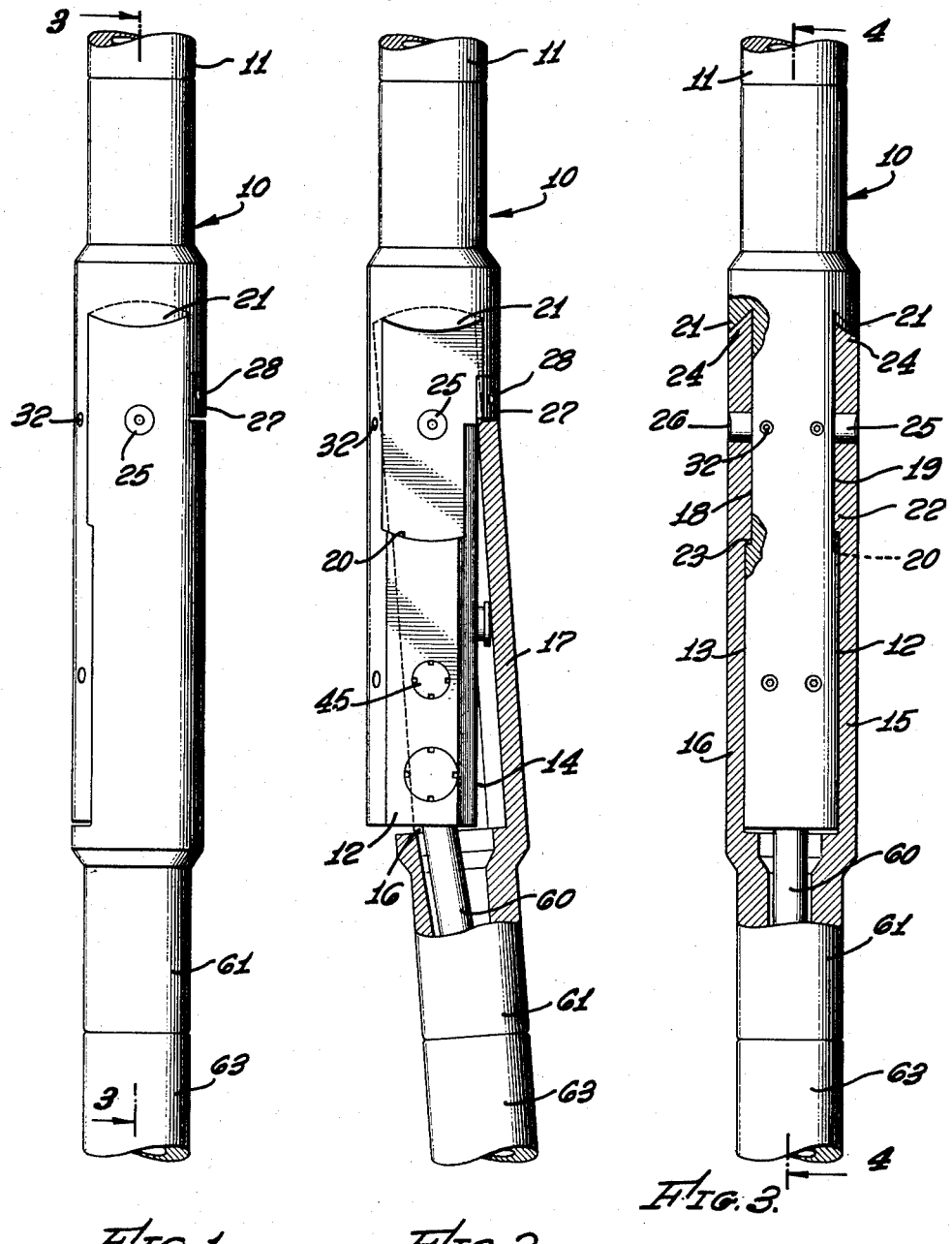
Fig. 1 is a view in side elevation of the improved fishing tool embodying the present invention the arm being shown in its normal or collapsed position.
Fig. 2 is a similar view with parts being broken away and shown in vertical section but illustrating the arm in extended position.
Fig. 3 is a vertical section taken substantially upon the line 3—3 upon Fig. 1.

Figs. 5, 6, 7 and 8 are horizontal sections taken substantially upon the lines 5—5, 6—6, 7—7 and 8—8 respectively upon Fig. 4;

Fig. 9 is a partial view in vertical section illustrating the details of construction of the piston which actuates the arm; and Fig. 10 is a partial view in vertical section illustrating the seal that is formed between the lower end of the wash pipe and the swingable arm.

Referring to the accompanying drawings wherein similar reference characters designate similar parts throughout, the improved knuckle comprises a body generally indicated at 10 attachable at its upper end to the bottom of a run-in string of pipe 11 which may be a string of drill pipe that is used to introduce the tool into the well for purposes of recovering the lost fish. The body 10 at its upper end is of generally cylindrical form but at the lower end thereof it has opposed flat sides 12 and 13 (see Fig. 6) and a flat back indicated at 14.

A swingable arm is provided which, adjacent its upper end, has a pair of opposed sides 15 and 16 connected by an integral back 17. The sides 15 and 16 are designed to fit snugly against the sides 12 and 13 of the body and the back 17 is designed to fit snugly against the back 14 when the arm is in its vertical or collapsed position.

Adjacent the upper ends of the flat sides 12 and 13 there are formed shallow recesses 18 and 19 at the bottoms of which there are formed arcuate shoulders 20. The tops of these recesses are defined by downwardly facing arcuate beveled shoulders 21. The sides 15 and 16 of the arm have bearing pads 22 formed on their inner surfaces which present downwardly facing arcuate shoulders 23 that are complementary to the shoulders 20. The tops of these bearing pads cooperate with the tops of the sides 12 and 13 to form upwardly facing arcuate beveled shoulders 24 that are complementary to the beveled shoulders 21 on the body.

Pivot pins 25 and 26 extend through the sides 15 and 16 of the arm and into the body 10 and are arranged in alignment. These pivot pins establish the axis of swing of the swingable arm. The radius of curvature of the shoulders 20 and 23, 21 and 24, is such that these shoulders are concentric with relation to the axis of swing established by the pivot pins 25 and 26. Thus, when the arm and body are assembled together the arm may swing relatively to the body as shown in Fig. 2 about the centers or axes of the pivot pins 25 and 26. However, during this swinging movement the beveled shoulders 21 and 24 remain in engagement and the shoulders 20 and 23 likewise remain in engagement and as these pairs of shoulders are arranged on relatively large radii as compared with the radii of the pivot pins 25 and 26, they are capable of relieving the pivot pins to a large extent of heavy strains that would otherwise be imposed thereon in the course of using the tool. The fact that the shoulders 21 and 24 are beveled causes these shoulders to assist in resisting any spreading action of the sides 15 and 16 when the arm is subject to heavy strains.

Outward swinging movement of the arm is limited by means of a stop block 27 that is detachably secured to the body such as by screws 28. This stop block is engageable by the top of the back 17 as shown in Fig. 2 and when engaged thereby outward swinging movement of the arm is limited.

In order to assemble the arm with the body the stop block 27 is removed from the body and as the distance between shoulders 20 and 21 is greater than the width of the sides 15 and 16, the sides 15 and 16 may be slipped onto the body opposite the recesses 18 and 19 while the arm is in an approximately horizontal position. The pivot pins 25 and 26 may then be inserted in the holes provided therefor in the sides 15 and 16 and in the body 10 and the arm then swung downwardly through the position shown in Fig. 2 and into the position shown in Fig. 1. The stop block 27 can then be applied to the body 10 locking the entire assembly together. The distance that the arm may swing outwardly with relation to the body is then limited by the stop block 27 as shown in Fig. 2 and if it is desired to increase the outward swinging of the arm this can be easily accomplished by removing the stop block 27 and grinding off its lower face sufficiently to enable the arm to swing out the desired distance. In this manner it will be appreciated that the stop block 27 performs a double function of adjustably limiting outward swinging movement of the arm as above explained and also locking the arm in assembled relationship with the body 10 in that after the tool has been assembled even if the pivot pins 25 and 26 should become lost or sheared off the arm cannot become disassembled from the body but must continue to swing between the arcuate shoulders 23 and 21 between the limits established by the engagement of the top of the back 17 with the stop block 27 and engagement of the back 17 with the back surface 14 of the body.

Inasmuch as the shoulders at the top and bottom of the bearing pads 22 can conveniently function to carry a substantial portion of the loads imposed on the tool, the pivot pins 25 and 26 can be of relatively small diameter as compared with the pivot pins heretofore employed so as to avoid weakening the body of the tool and need not extend entirely through the body. The inner ends of these pivot pins are preferably shaped to conform to the exterior of a pipe or liner 29 that extends vertically downward through the body and is seated against a gasket 30. This pipe which is retained in position by means of a tubular nut or thimble 31 serves to conduct circulation fluid down through the body past the inner ends of the pivot pins 25 and 26 thus effectively preventing any escape of circulation fluid around the pivot pins which, if allowed to occur, would be apt to cut out the body around the pivot pins. The pivot pins are locked in position within the body by means of screws 32 but can be withdrawn on removal of these screws by inserting a pulling tool into threaded holes 33 formed in the ends of the pivot pins.

As a means for actuating the arm there is disposed below the lower end of the pipe 29 a horizontal cylinder 34 which is inserted into the body from the back 14. This cylinder is retained in position by means of a threaded nut 35 preferably equipped with a gasket 36. It has apertures 37 in the top and bottom thereof which are designed to register with the bore 38 formed in the body which is a continuation of the passage formed by the interior of the pipe 29. Within the cylinder 34 there is disposed a piston 39, the skirt 40 of which has elongated slots 41 formed therein which have widths substantially equal to the diameters of the apertures 37. The lengths of the slots 41 are such that in all positions of the piston when the tool is assembled the bore 38 will be constantly open so that circulation fluid pumped downwardly through the bore 38 may at all times enter the piston and urge it outwardly into engagement with the back 17 of the arm, as illustrated in Fig. 9. The piston is held against rotation within the cylinder by means of a pin 42 which projects inwardly from the cylinder into a groove 43 formed on the exterior of the skirt 40. Thus, although the pin 42 prevents the piston from rotating within the cylinder, it may freely slide therein under the influence of the hydraulic pressure supplied through the bore 38.

Below the cylinder 34 there is disposed a housing 44 for an openable choke or bean. This housing is retained in position by means of threaded plugs 45 that are screwed into the sides 12 and 13 of the body. Within the housing there are two opposed parts 46 and 47 of the choke or bean. These parts have opposed recesses 48 which, when the parts are in mutual engagement, cooperate to form a passage through the bean which is of small diameter. The opposed faces of the parts 46 and 47 are preferably covered with a facing 49 of rubber or rubber-like material that is vulcanized directly to the parts of the bean. This rubber facing serves to effectively resist cutting action of the circulation fluid which is pumped downwardly through the tool under high pressures. The bean provided by the two parts 46 and 47 can be opened by dropping or lowering through the straight bore 38 a go-devil or sinker bar to separate or spread the two parts 46 and 47. Such movement is permitted by means of spring-actuated retainers which have springs 50 compressed between the retainers 51 and screw plugs 52. The retainers 51 have pins 53 that extend through apertures in the housing 44 and into grooves 54 on the sides of the parts 46 and 47. At the ends of these grooves there are recesses 55 into which the pins may enter so that the retainers 51 will serve to retain the parts 46 and 47 in mutual engagement as shown in Fig. 7, until such time as they may be forcibly spread apart by a go-devil or similar tool. When they are spread apart the retainers will then have their pins cammed out of their outermost recesses and will be allowed to enter the innermost recesses 55 so as to retain the parts of the bean in their spread or open condition. When the bean is open the lower end of the bore 38 is completely opened thereby but when the bean is closed only a restricted passage is provided for the discharge of circulation fluid causing a back pressure to build up within the piston 39 to actuate the piston and consequently swing the arm.

Adjacent the lower end of the body there is disposed a rocker shaft 56 having an aperture therethrough indicated at 57 designed to register with the bottom end of the bore 38. This rocker shaft is retained in position by means of a threaded plug 58 screwed into the side of the body and below the rocker shaft the body is enlarged or coned out as at 59 to accommodate the swinging movement of a wash pipe 60. The wash pipe 60 has its upper end screwed into the under side of the rocker shaft 56 so that the interior of the wash pipe cooperates with the aperture 57 in forming a straight continuation of the bore 38 when the arm is hanging vertically.

The lower end of the arm is cylindrically formed as indicated at 61 and terminates in a threaded pin 62 providing for attachment of any suitable fish-engaging tool such as is indicated at 63. The pin 62 also provides an internal shoulder 64 against which a ring 65 is positioned. The ring 65 has its inner edge positioned against an external shoulder 66 formed adjacent the bottom of the wash pipe 60. A rubber sleeve 67 is slipped onto the reduced bottom of the wash pipe 60 and has a flange 68 adapted to be tightened against the ring 65 by means of a hollow nut 69 that is screwed into the pin 62. This nut preferably has a considerable clearance indicated at 70 with the bottom of the sleeve in order to accommodate movements of the wash pipe 60 with relation to the lower end 61 of the arm when the arm is swung.

The operation and advantages of the above described tool are substantially as follows. When it is desired to engage and remove a fish such as a lost string of drill pipe from a well, the tool is attached to the drill pipe 11 and lowered therein. In its initial position the bean parts 46 and 47 are in mutual engagement permitting a limited or restricted amount of circulation fluid to pass therethrough. When the tool has been lowered to the desired level within the well circulation fluid is pumped down through the drill pipe 11 and although some of this circulation fluid may pass through the restricted opening provided by the bean, a back pressure is developed to actuate the piston 39 and thus swing the arm outwardly into engagement with the well walls. The drill pipe 11 can then be rotated to cause the tool 63 to engage the lost string of drill pipe and establish a connection therewith. If it is desired to force large quantities of circulation fluid down through the knuckle and into the fish or around the fish for purposes of loosening it, a go-devil or similar tool may be lowered to open the bean parts 46 and 47. Thereafter the circulation fluid may be pumped down through the bore 38 without restriction. In the course of swinging the arm it will be appreciated that the arm will swing about the axes of the pivot pins 25 and 26 as a center whereas the wash pipe 60 will be required to swing about the axis of the rocker shaft 56 as a center. This causes relatively angular movement to take place between the wash pipe and the arm. Such angular movement, however, is permitted by the compressible rubber flange 68 without in any way destroying or weakening the seal between the lower end of the wash pipe and the pin 62. Consequently, if desired, large quantities of circulation fluid under high pressure can be discharged downwardly through the knuckle without danger of leakage or cutting out of portions of the tool.

If it is desired to jar the tool and consequently the fish either upwardly or downwardly, appropriate sets of jars may be incorporated in the drill pipe 11 and as the jarring is performed the major portion of the stresses transmitted from the body 10 to the arm will be carried by the shoulders 20, 23, 21 and 24, so that the pivot pins 25 and 26 will be required to assume very little, if any, of these severe stresses.

Various changes may be made in the details of construction without departing from the spirit and scope of the invention as defined by the appended claims.

I claim:

1. A device of the class described wherein there is a body attachable to a run-in string of pipe, an arm pivotally mounted on said body for swinging movement relatively thereto, means for swinging the arm relatively to the body, said arm having opposed sides bearing against the sides of the body, the top edges of the sides being beveled inwardly and arranged on arcs concentric with the pivot for the arm, the sides of the body presenting complementary overhanging surfaces engageable therewith whereby strains on the pivotal connection may be partially relieved thereby.

2. A device of the class described wherein there is a body attachable to a run-in string of pipe, an arm pivotally mounted on said body for swinging movement relatively thereto, means for swinging the arm relatively to the body, said arm having opposed sides bearing against the sides of the body, the sides having bearing pads recessed in the sides of the body presenting arcuate surfaces in bearing engagement with the body above and below the axis of pivot of the arm concentric with the pivotal connection.

3. A device of the class described having a body attachable to a run-in string of pipe, an arm pivotally mounted thereon for swinging movement relatively thereto, there being a vertical central bore through the body, a hollow piston mounted for sliding movement within the body engageable with the arm to swing it relative to the body, said piston having an elongated slot therein as wide as and in registry with the bore in the body and of such a length that in all positions of the piston the bore will always be fully open, and means for holding the piston against rotation within the bore.

4. A device of the class described comprising a body attachable to a run-in string of pipe, an arm pivotally mounted upon said body for swinging movement relatively thereto there being a vertical central bore in the body, a piston exposed to pressures within said bore and operable thereby to swing the arm relative to the body, and an openable bean in the bore below the piston, said bean having opposed rubber faced parts movable toward and away from each other across the bore to choke or open the bore, and means for releasably holding the parts of the bean in mutual engagement or in spaced relation.

5. A device of the class described, a body attachable to a run-in string of pipe, an arm swingably mounted on the body, said body having a vertical central bore therethrough, a wash pipe swingably mounted upon the bottom of the body and extending downwardly into the arm, there being a downwardly facing shoulder on the wash pipe, a downwardly facing shoulder on the interior of the arm, a ring positioned against said shoulders, a flanged rubber sleeve disposed about the wash pipe having its flange held against said ring.

6. A device of the class described, a body attachable to a run-in string of pipe, an arm swingably mounted on the body, said body having a vertical central bore therethrough, a wash pipe swingably mounted upon the bottom of the body and extending downwardly into the arm, there being a downwardly facing shoulder on the wash pipe, a downwardly facing shoulder on the interior of the arm, a ring positioned against said shoulders, a flanged rubber sleeve disposed about the wash pipe having its flange held against said ring, the exterior of the rubber sleeve being disposed in spaced relation to the interior of the arm below said flange to enable the wash pipe to swing relatively to the arm.

7. A device of the class described wherein there is a body attachable to a run-in string of pipe, an arm pivotally mounted upon said body for swinging movement relatively thereto, means for swinging the arm relatively to the body, said arm having opposed sides bearing against the sides of the body, the sides having bearing pads recessed in the sides of the body presenting arcuate surfaces in bearing engagement with the body above and below the axis of pivot of the arm concentric with the axis of pivot, one of the arcuate surfaces on each pad being beveled inwardly and the body presenting surfaces in bearing engagement therewith complementary thereto whereby strains on the pivotal connection may be partially relieved by the mutually engaged bearing surfaces and the mutually engaged beveled surfaces will resist spreading of the sides of the arm when the arm is under severe strain.

CLARENCE P. YOUNG.

References Cited in the file of this patent

UNITED STATES PATENTS

| Number | Name | Date |
|---|---|---|
| 1,594,668 | Gates et al. | Aug. 3, 1926 |
| 1,800,490 | Young | Apr. 14, 1931 |
| 2,242,279 | Young | May 20, 1941 |